Oct. 21, 1952

C. E. JOHNSON ET AL 2,614,467

FLASH SYNCHRONIZER FOR CAMERAS

Filed May 12, 1948

INVENTORS
CHARLES EINAR JOHNSON
GEORGE HARADEN
ROBERT F. McCAMMON
BY
Lamphere and Van Valkenburgh
ATTORNEYS Patented Oct. 21, 1952

2,614,467

UNITED STATES PATENT OFFICE 2,614,467

FLASH SYNCHRONIZER FOR CAMERAS

Charles Einar Johnson, George Haraden, and Robert F. McCammon, Denver, Colo., assignors to Heiland Research Corporation, Denver, Colo., a corporation of Colorado Application May 12, 1948, Serial No. 26,694

3 Claims. (Cl. 95—11.5)

This invention relates to synchronizers and more particularly synchronizers or timing devices for causing the firing of a flash bulb in properly timed relation with the operation of a camera shutter.

One of the objects of our invention is to produce an improved electro-magnetic flash synchronizer for a camera.

Another object is to produce in flash synchronizers for cameras, improved electro-magnetic means for operating the shutter.

A further object is to provide improved adjustable linkage means for connecting an electro-magnet to a camera shutter-operating lever.

A still further object is to provide an improved mounting arrangement for an electro-magnet employed in a flash synchronizer for cameras which will permit easy and rapid mounting of the electro-magnet on a large variety of cameras and without the necessity of any drilling or use of attaching screws.

Yet a further object is to provide improved synchronizer means for a camera which will permit the taking of "time" and "bulb" exposures without disconnecting the connection between the electro-magnetic means and the shutter-operating lever and further insuring that the synchronizer adjustment for instantaneous exposures will not be disturbed.

Still another object is to embody in the connection linkage between an electro-magnet and a shutter-operating lever, means for tripping the said shutter-operating lever by a manually-operated member, as desired, without the necessity of directly touching the said lever by any part of the hand.

Other objects of the invention will become apparent from the following description taken in connection with the accompanying drawings showing, by way of example, structure embodying the said invention.

Figure 1:
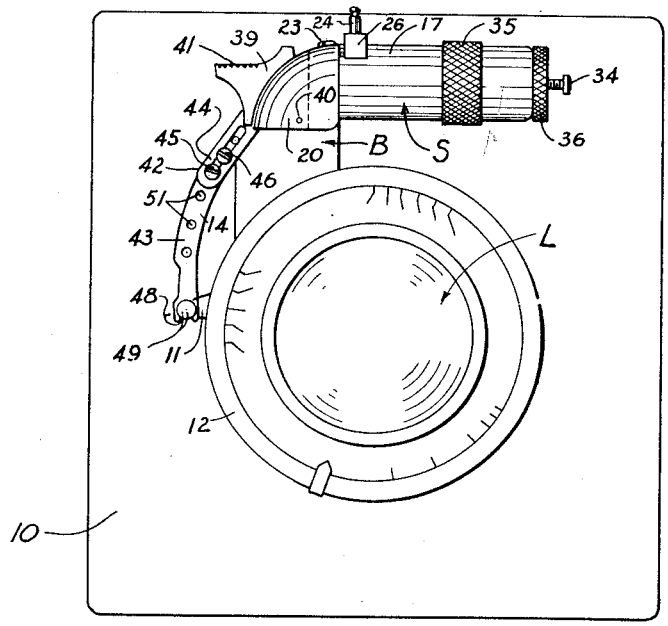
Figure 1 is a front view of a lens board of a camera showing synchronizer means constructed in accordance with the invention and mounted on the board for actuation of the shutter-operating lever.

Referring to the drawings in detail and first to Figure 1, there is shown, by way of example only, a lens board 10 of a bellows type camera. As is well known, this lens board is movable in and out of the camera case on suitable tracks which will carry it by the fold-up cover of the camera. The lens board carries the usual lens L of the camera, with which is associated shutter mechanism not shown, said shutter mechanism being tripped, after cocking, by a lever 11 which extends laterally from the casing 12 carrying the lens and shutter, said casing being clamped in a well known manner to the lens board.

Our improved synchronizer assembly is generally indicated by the letter S and embodies a solenoid. This assembly may be mounted on the lens board by any suitable mounting bracket such as the bracket B. The particular mounting bracket shown is in the form of an annular disc, having a projection 14 to which the synchronizer is securely attached, as by screws 15 and 16. The annular disc is arranged to be clamped to the lens board by the lens casing 12. The particular mounting bracket and manner of attaching to the lens board, without the necessity of any specially tapped holes and screws, forms no part of this invention, such being covered by a separate application.

Figure 3:
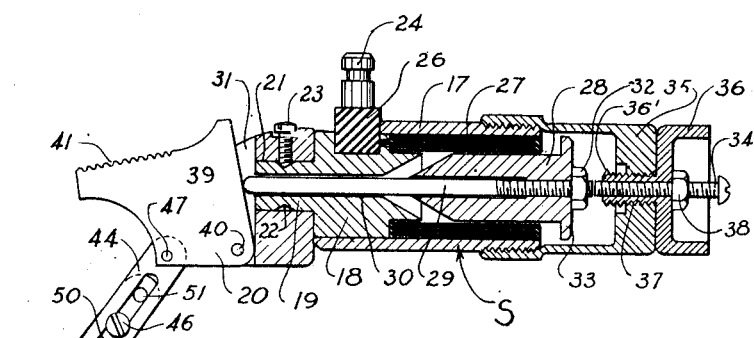
Figure 3 is an enlarged longitudinal sectional view showing details of the solenoid and associated structure.
Figure 4:
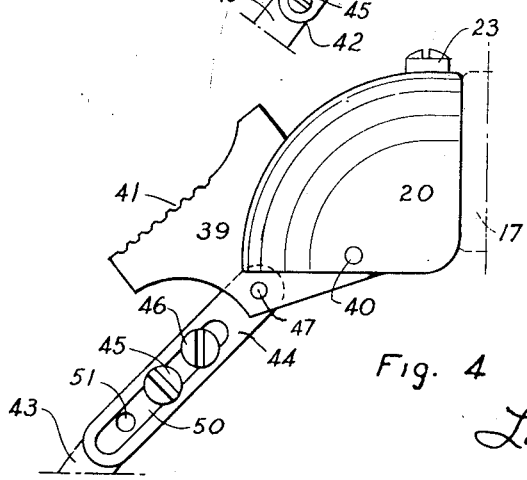
Figure 4 is an enlarged view showing details of the synchronizer head, the hammer and the adjustable connecting linkage between the solenoid and the shutter-operating lever, the linkage and hammer being in positions assumed when the shutter is operated.

As best seen in Figures 1, 3 and 4, the solenoid assembly of the synchronizing means is formed with a tubular body 17, and carried in pressed relation in one end of this casing is a pole piece 18 having a reduced projection 19 to which is attachable the head member 20. The head member is formed with a bore 21 receiving the projection 19 which, it will be noted, has an annular groove 22 into which can be received the inner end of an attaching screw 23 carried by the head. With this arrangement, the casing 17 and the pole piece 18 carried thereby can be attached to the head in various angular relations and thus allow for the terminals 24 and 25 of the solenoid, which are carried by the pole piece, to be arranged for convenient connection with a suitable connector. The two terminals are arranged to be suitably insulated from each other by the block of insulation 26, into which the terminals are set.

Within the casing 17 is the coil 27 of the solenoid, the ends of which are arranged to be connected to the two terminals. The coil is in surrounding relation to the plunger 28 of the solenoid, said plunger being carried on a plunger rod 29 which is arranged to extend through a central opening 30 of the pole piece and project into a slot 31 of the head. The plunger is held on the rod by a nut 32 carried by the rear end of the rod and in order to limit the extent of forward movement of the plunger, the rear end thereof is provided with a flange 33 for engagement with the rear end of the coil 27. In order to produce maximum magnetic pull on the plunger, the forward end of the plunger is of conical form and a complementary conical receiving recess is provided in the inner end of the pole piece.

The extent to which the plunger of the solenoid can be retracted from the pole piece is determined by a stop screw 34 carried by a cap 35 screwed onto the rear end of the casing 17. The adjusting screw 34 is threaded in and extends through a cap screw 36 which has a threaded extension 37 screwed into a threaded opening in the base of the cap 35. With this arrangement, the adjusting screw 34 will be movable with the cap screw under all conditions, yet the screw 34 can be adjusted relatively to the cap screw as desired. In order to positively maintain any adjustment of the adjusting screw, a lock nut 38 is provided. The inner threaded end of the cap screw is "staked," as shown at 36', so that the cap screw can only be backed up a limited distance, and also to prevent the cap screw from being completely unscrewed from cap 35 and lost.

Under normal operating conditions for instantaneous exposures, when the solenoid is being employed to operate the shutter-operating lever of the camera, the cap screw 36 will be screwed into the cap as far as possible so that it will abut the end of the cap 35 and then the adjusting screw set to provide the desired "stop" starting position for the plunger of the solenoid. The screw will be set so that when the circuits are energized the plunger will have moved to a position fully opening the shutter at the time the flash bulb is fired and at maximum brilliancy. This adjustment will be maintained by the lock nut. If it should be desired to permit a greater retractile movement than that afforded by the adjusting screw, such can be quickly done by merely screwing off the screw cap with respect to the solenoid cap 35. Since the adjusting screw is carried by the screw cap, it will then move with the screw cap and a new retraction stop for the plunger will be established. However, it is to be noted that the adjustment established between the screw 34 and the cap screw will not be disturbed, and whenever it is desired to again re-establish the normal pre-set stop for the plunger, it can be accomplished by merely screwing up the cap screw 36 until it is tight against the cap 35.

In order to transmit movement of the solenoid to operate the shutter-operating lever 11, the head pivotally carries a hammer 39, said hammer being positioned in the previously referred to slot 31 of the head and arranged to be swingable about the pivot pin 40 adjacent the bottom of the slot. The hammer has a projecting portion 41 which has a serrated top surface so that the hammer can be manually operated by a thumb or finger merely by pressing downward on the serrated surface. Between the hammer and the shutter-operating lever is an adjustable linkage structure 42 formed of two links 43 and 44 clamped together by two screws 45 and 46. The upper link 44 is pivoted to the hammer by a pin 47 and the lower link 43 has a forked end 48 which is adapted to receive a projection 49 on the shutter-operating lever 11. Link 44 is formed with a longitudinal slot 50 and the link 43 is provided with a plurality of spaced apart tapped holes 51, into which are received the screws 45 and 46. The bodies of the screws are arranged to extend through the slot 50 in the link 44 and the heads of the screws are arranged to engage against the surface of the link 44 adjacent the slot, and in this manner clamp the link 44 to the link 43. With this adjustable linkage arrangement comprising the two links and the two screws, it will be possible to make any adjustment desired, within limits, for the length of the connecting linkage between the hammer and the shutter-operating lever. Thus, the hammer of the solenoid is arranged to be connected to any shutter operating lever which has a position along one side of the lens casing. If it is desired to have the linkage as long as possible, the two set screws can be placed in the two upper holes of link 43 and then a final adjustment made by sliding the slot 50 of the upper link with respect to the set screws. Such an adjustment is shown in Figure 4. If it is desired to have the linkage shorter, the set screws can be placed in holes toward the central part of the link 43, as is shown in Figure 1.

Figure 2:
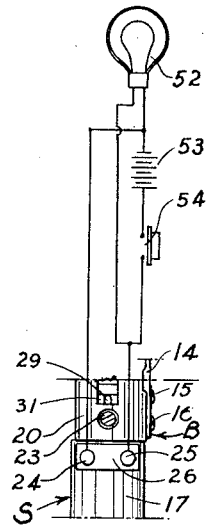
Figure 2 is a wiring diagram showing the circuits for the synchronizer and the flash bulb.

As shown in Figure 2, the terminals of the solenoid are to be connected in circuit with the photo flash bulb 52 forming a flash synchronizer means. This photo flash bulb is connected in series with a battery 53, or other suitable source of electrical energy, and a switch 54, so that upon closing the switch the flash bulb will be fired. The two terminals of the solenoid are arranged to be connected in parallel arrangement with the photo flash bulb circuit so that the switch 54 when closed will also cause an energization of the solenoid and an operation of its plunger 28.

From the foregoing description, it is believed to be obvious as to how our improved synchronizer means operates. When the solenoid is mounted on the lens board by means of a suitable mounting bracket, and connected up with the photo flash bulb, a mere closing of the switch 54 will cause the flash bulb to be fired and the shutter-operating lever to be tripped. After mounting the solenoid by means of the bracket, the proper adjustment of the connecting linkage 42 is made so that a movement of the hammer will cause opening of the shutter. For obtaining the properly timed opening of the shutter and flash bulb firing, the adjusting screw 34 will be properly set. This setting of the set screw is made when the cap screw 36 is fully screwed up and abutting the cap 35. Once the adjusting screw is properly set, it can be locked by the lock nut 38 and it need never be changed for proper synchronization of the opening of the shutter and the firing of the flash bulb when instantaneous exposures are desired. However, if at any time it is desired to take "time" or "bulb" exposures, which exposures require a greater throw of the shutter operating lever than when taking flash exposures, it will be possible to do so without disturbing the relation of the adjusting screw and the cap screw made for proper flash exposure. All that needs to be done is to back off the cap screw 36. This will then back off the adjusting screw 34, since it is carried by and locked to the cap screw. Consequently, the stop provided by the adjusting screw for the plunger will be moved back from the plunger, thus allowing the hammer to be moved back in the slot 31 of the head. The "time" and "bulb" exposures can then be made by merely operating the hammer 41 with a finger or thumb pressure on the serrated surface thereof. With this arrangement it will not be necessary to disconnect any linkage or disturb any previous set up adjustment between the solenoid and the shutter-operating lever. When it is desired to again prepare the camera for taking instantaneous or flash exposures, it is only necessary to screw up the cap screw 36 until it abuts the cap 35 and the proper adjustment is then again present so that the opening of the shutter and the firing of the flash bulb will be synchronized.

It is to be particularly noted that with our improved synchronizer all adjustments are simple. The adjustable linkage connection permits the synchronizer to be readily and conveniently connected to variously positioned shutter-operating levers. The synchronizer is arranged to be positioned in an out-of-the-way place on the lens board. Manual operation of the shutter is always available and can be accomplished in an easy manner and without the necessity of placing the hand on the shutter-operating lever. Once the synchronizer is installed, no disconnection is necessary in order to take any type of exposure desired.

Being aware of the possibility of modification in the particular synchronizer structure shown without departing from the fundamental principles of our invention, we do not intend that the invention be limited in any manner except in accordance with the appended claims.

What is claimed is:

1. In a synchronizer structure of the class described to be mounted as a single unit on a camera lens board, a solenoid, a plunger therefor movable when the solenoid is energized, a casing means for the plunger, said casing means having a threaded bore at its rear end, a pivoted member pivotally mounted on the casing means and having a manually engageable projecting portion, means for operating the pivoted member by the plunger, connecting means from the pivoted member and a shutter-operating lever including adjusting means for varying the length of the connecting means, and adjustable stop means for the retracted position of the plunger to thereby vary the starting point of the plunger movement to operate the shutter, said stop means comprising a screw member on the casing means with a projecting port threaded in the casing bore and being adjustable from a fixed position rearwardly with respect to the solenoid, and an adjustable screw carried by the screw member with its inner end engageable by the plunger, said adjustable means for varying the length of the connecting means between the pivoted member and the camera shutter-operating lever permitting the adjustable stop means to be adjusted in a manner, when the solenoid is energized in taking flash exposures, that the screw member can be unscrewed rearwardly and so bodily place the adjusting screw that the pivoted member is permitted to have such greater swinging movement that the shutter-operating lever can be so operated manually by manual operation of the pivoted member that "time" and "bulb" exposures are possible without disconnecting the adjustable connecting means from the shutter-operating lever.

2. In a synchronizer for timed firing of a flash lamp and operation of a camera shutter, an electro-magnet, a movable armature, a casing means for the electro-magnet including a rear closure portion having a threaded bore axially aligned with the axis of the armature, means for connecting the armature to operate the shutter and adjustable stop means for determining the starting point of the movement of the armature to operate the shutter when the electro-magnet is energized, said adjustable stop means comprising a thumb and finger operated member having a tubular projection with inner and outer threads and screw mounted in the threaded bore of the rear closure portion of the casing means and arranged to engage the casing means surrounding the outer end of the bore as a stop when screwed in one direction and when screwed in the opposite direction to move in a direction away from the direction of movement of the armature when operating the shutter, and an adjusting screw threaded in the tubular extension of the member and arranged so that it will extend through the tubular extension of the member so as to have its inner end in the casing means for engagement by the armature to thereby determine its starting position, and means for locking the adjusting screw in adjusted position with respect to the screw mounted member, said adjustable stop means permitting the screw to remain locked in a predetermined adjustable position yet retractable and resettable with respect to the plunger without disturbing the casing means therefor merely by backing off the thumb and finger member and screwing it back to stop against the closure part of the casing.

3. In a synchronizer for timed firing of a flash lamp and operation of a camera shutter, a coil, a plunger within the coil and movable when the coil is energized, a casing surrounding the coil, means for connecting the plunger to the camera shutter to thereby cause operation thereof when the coil is energized, a cap detachably mounted on the casing and forming a closure for the rear end thereof and having a threaded bore in its bottom, a cup-shaped member having a tubular extension from its bottom threaded in the bottom bore of the cap with its bottom engaging the exterior of the bottom of the cap to provide a definite stop limiting the extent the extension can be screwed into the cap and adapted to be unscrewed from the cap a substantial distance, an adjusting screw threaded into the tubular extension and projecting into the cap for providing an adjustable stop engageable by the plunger and determining the starting point of its movement to operate the shutter, and a nut within the cup-shaped member to engage its bottom for locking the screw in adjusted position with respect to the member, said structure permitting the adjusting screw to remain in locked adjusted position in the member yet be retracted from and returned to its stop position for the plunger by screwing the member away from and back to abut the cap, all without disturbing the casing cap.

C. EINAR JOHNSON.
GEORGE HARADEN.
ROBERT F. McCAMMON.

REFERENCES CITED

The following references are of record in the file of this patent:

UNITED STATES PATENTS

| Number | Name | Date |
|---|---|---|
| 2,161,355 | Jacobson | June 6, 1939 |
| 2,176,573 | Hershberg | Oct. 17, 1939 |
| 2,176,972 | Lindahl | Oct. 24, 1939 |
| 2,324,075 | Gillon et al. | July 13, 1943 |
| 2,464,671 | Castedello | Mar. 15, 1949 |
| 2,523,660 | Hulstein | Sept. 26, 1950 |